United States Patent [19]
Deschenes et al.

[11] Patent Number: 5,671,507
[45] Date of Patent: Sep. 30, 1997

[54] FASTENER FOR ATTACHING A BUTTON OR THE LIKE TO A GARMENT OR PIECE OF FABRIC

[75] Inventors: Charles L. Deschenes, North Attleboro; Randall Jay Sword, Danvers; Christine Joann Jantz, Cambridge, all of Mass.

[73] Assignee: Avery Dennison Corporation, Pasadena, Calif.

[21] Appl. No.: 584,963

[22] Filed: Jan. 11, 1996

[51] Int. Cl.$^6$ .................... A44B 1/00; D05B 3/00
[52] U.S. Cl. ............. 24/114.7; 24/90.1; 24/72.7; 24/711; 2/265
[58] Field of Search ................ 24/114.7, 90.1, 24/711, 710.5, 72.7; 2/265

[56] References Cited

U.S. PATENT DOCUMENTS

| | | |
|---|---|---|
| 39,935 | 9/1863 | Lambert. |
| 903,674 | 11/1908 | Cohn ........................ 24/114.7 |
| 1,032,735 | 7/1912 | Brown. |
| 1,165,759 | 12/1915 | Coughlin ..................... 24/72.7 |
| 1,598,597 | 9/1926 | Baggerud ................... 24/114.7 |
| 1,682,771 | 9/1928 | Butler. |
| 2,104,885 | 1/1938 | Robbins ..................... 24/114.7 |
| 3,154,036 | 10/1964 | Fimmel. |
| 3,816,200 | 6/1974 | McKenna. |
| 3,900,925 | 8/1975 | La Torraca. |
| 4,251,311 | 2/1981 | Lemelson. |
| 4,333,182 | 6/1982 | Seibt. |
| 4,615,081 | 10/1986 | Lindahl. |
| 4,773,343 | 9/1988 | Riche. |
| 5,383,260 | 1/1995 | Deschenes et al.. |

*Primary Examiner*—Victor N. Sakran
*Attorney, Agent, or Firm*—Kriegsman & Kriegsman

[57] ABSTRACT

A fastener for attaching a button or the like to a garment or piece of fabric is provided, the button having an outer surface and two or more holes. The fastener comprises a U-shaped filament, a first foot at one end of the filament, and a second foot at the opposite end of the filament. The fastener is constructed of plastic except for the filament or at least a portion thereof which is made of thread. The first foot and the second foot are appropriately dimensioned so as to be insertable through two holes in the button as well as through the garment in such a way as to be retained by the underside of the garment. The length of the portion of the filament made of thread is sized so that when the first and second feet of the fastener are inserted through the button holes and the garment, only thread is visible over the outer surface of the button so as to give the illusion that the button has been attached to the garment or piece of material using only thread. In one embodiment of the present invention, the first and second feet are in the shape of elongated bars perpendicular to the filament.

16 Claims, 4 Drawing Sheets

FASTENER FOR ATTACHING A BUTTON OR THE LIKE TO A GARMENT OR PIECE OF FABRIC

BACKGROUND OF THE INVENTION

The present invention relates generally to fasteners and more particularly to a new and novel fastener which is particularly well-suited for use in coupling or recoupling a button or the like to a garment or piece of fabric.

The conventional method of attaching buttons to garments or fabrics, either by machine or by hand, is with thread. In this method, the button to be attached is positioned at a desired location on the garment or piece of fabric. Then, a needle containing thread is inserted through each of the two, three or more holes in the button and through the garment or fabric several times until sufficient strands of thread exist to securely hold the button onto the garment or fabric. The ends of the thread are then tied or otherwise fastened so that the thread will not unravel. In some instances, where it is desired to elevate the button from the garment or fabric, a pedestal effect is achieved by laterally wrapping the strands with additional thread. A problem with this method is that it is relatively slow and tedious. Another problem is that the button can become detached if the thread is severed or if the ends of the thread are not secured properly.

In U.S. Pat. No. 4,773,343 to Riche there is disclosed a method for attaching a button to a piece of fabric or clothing. The method includes the step of pre-threading a two or four-holed button with a piece of tying thread fixedly connected at each end to a separate needle and then inserting the needles through the fabric or clothing in order to attach the button. Once the needles are pulled through the fabric, a double knot is tied close to the fabric on the needle end side. The needles are then discarded by cutting the thread at a point adjacent the fabric. The method enables offsetting the button from the fabric or garment and also avoids the complications of having to thread the button holes and the fabric sequentially as part of the attachment process. As can be appreciated, this method involves the use of specially constructed thread.

In U.S. Pat. No. 4,333,182 to Seibt there is disclosed a button anchor apparatus which comprises an elongated elastic thread having an elongated needle portion formed on one end thereof and an elongated ferrule formed on the other end, the ferrule having a bore formed in one end thereof. The ferrule bore is adapted to accept the needle for locking the button to the garment. A method of attaching a button with a button anchor apparatus is also disclosed, the method including the steps of pushing the needle through the garment, threading the elastic thread through the button and back through the garment, then attaching the end of the needle into the open end of the ferrule by stretching the elastic thread to allow the elongated needle to be aligned with and inserted into the ferrule bore. A disadvantage of this apparatus is that very often it does not hold the button tightly in place on the garment.

In U.S. Pat. No. 5,383,260 to Deschenes et al, which patent is incorporated herein by reference, there is disclosed a plastic fastener for use in attaching a button to a garment or a piece of fabric. The plastic fastener comprises a flexible U-shaped filament having a foot at each end. The filament portion of the fastener is preferably rectangular in cross-section and has a non-uniform thickness, i.e., thinner at the ends and thicker in the arcuate region, to maximize the strength of the fastener. The feet are appropriately dimensioned so that they may be inserted into a desired garment through a pair of button holes of conventional size and thereafter be retained by the underside of the garment. Each foot has rounded ends, a flat top surface and a compact size to minimize irritation with a person's skin. Also disclosed is a fastener clip comprising a plurality of these fasteners and a tool for dispensing the fasteners.

The use of plastic fasteners, such as disclosed in the above noted U.S. Pat. No. 5,383,260, to attach buttons to a piece of material has two principal advantages over the use of thread. First, using plastic fasteners to secure a button to a piece of material is an extremely quick and simple process compared to securing a button to a piece of material using thread. A plastic fastener, when used with a fastener dispensing tool, secures a button to a piece of material essentially through a one-step process. By simply ejecting the fastener from the dispensing tool by means of a trigger on the tool, the fastener is inserted through the button and the material, thereby securing the button to the material. Second, the durability of a plastic fastener is significantly greater than thread. Due to the increased rigidity and durability of plastic as opposed to thread, a plastic fastener will more securely hold a button onto a piece of fabric. In addition, the plastic fastener will run less of a risk of breaking over time than thread, the severing of which would cause the button to separate from the fabric.

However, despite the numerous advantages of plastic fasteners compared to thread in securing a button to a piece of material, it has been found that some people disfavor plastic fasteners because the fastener tends to become conspicuous when used to replace a button on an article of clothing in which all the other buttons are retained by thread. Because the plastic fastener tends to stand out visually in comparison to thread, some people prefer using thread over plastic fasteners to reattach buttons to a fabric regardless of the numerous advantages associated with plastic fasteners.

SUMMARY OF THE INVENTION

It is an object of the present invention to provide a new and improved fastener.

It is another object of the present invention to provide a new and improved fastener which is particularly well-suited for attaching a button or the like to a garment or piece of fabric.

It is still another object of the present invention to provide a fastener as described above which, when used to attach buttons or the like to a garment or piece of fabric, can achieve a look similar to that achieved with thread.

It is a further object of the present invention to provide a fastener as described above which is designed for strength and an aesthetically unobjectionable appearance.

It is yet another object of the present invention to provide a fastener as described above which can be dispensed through a fastener dispensing tool.

It is still another object of the present invention to provide a fastener as described above which can be mass produced and can be very easily used.

Accordingly, there is provided a fastener for attaching a button or the like to a garment or piece of fabric, the button having a top surface and two or more holes, the fastener comprising a filament, a first foot at one end of the filament and a second foot at the other end of the filament, the fastener being made of plastic except for the filament or at least a portion thereof which is made of thread, the fastener being sized so that when a button is attached to a garment or piece of fabric with the fastener, the only part of the fastener visible over the button is made of thread. The use of plastic gives the fastener strength while the thread portion creates the illusion that thread has been used to attach the button to the garment or piece of fabric.

Additional objects, as well as features and advantages, of the present invention will be set forth in part in the description which follows, and in part will be obvious from the description or may be learned by practice of the invention. In the description, reference is made to the accompanying drawings which form a part thereof and in which is shown by way of illustration of various embodiments for practicing the invention. These embodiments will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

The accompanying drawings, which are hereby incorporated into and constitute a part of this specification, illustrate various embodiments of the invention and, together with the description, serve to explain the principles of the invention. In the drawings wherein like reference numerals represent like parts.

DETAILED DESCRIPTION OF A PREFERRED EMBODIMENT

Figure 1:
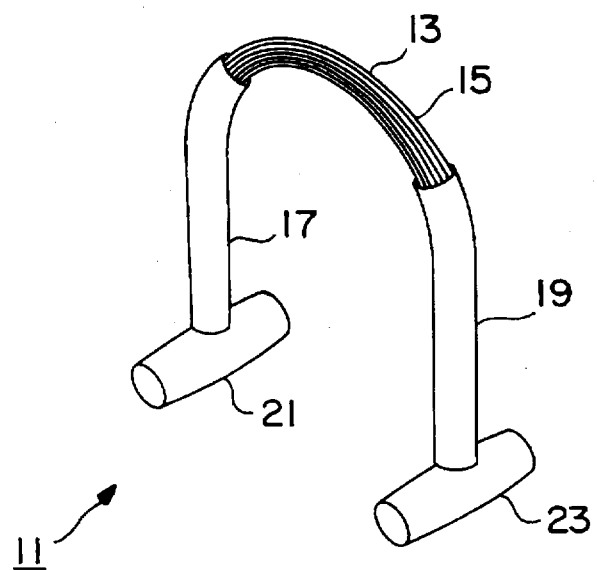
FIG. 1 is a front, right perspective view of a fastener constructed according to the teachings of the present invention.

Referring now to FIG. 1, them is shown a perspective view of a fastener for attaching a button or the like to a garment or piece of fabric, the fastener being constructed according to the teachings of the present invention and being represented generally by reference numeral 11.

Fastener 11 comprises a generally U-shaped filament 13. Filament 13 includes a center portion 15 and a pair of end portions 17 and 19. Fastener 11 further comprises a first foot 21 at one end of filament 13 and a second foot 23 at the other end of filament 13. First and second feet 21 and 23 are in the shape of elongated bars and are disposed at right angles to filament 13.

Fastener 11 is made of plastic except for center portion 15 of filament 13 which is made of thread. The plastic may be, for example, urethane.

Figure 2:
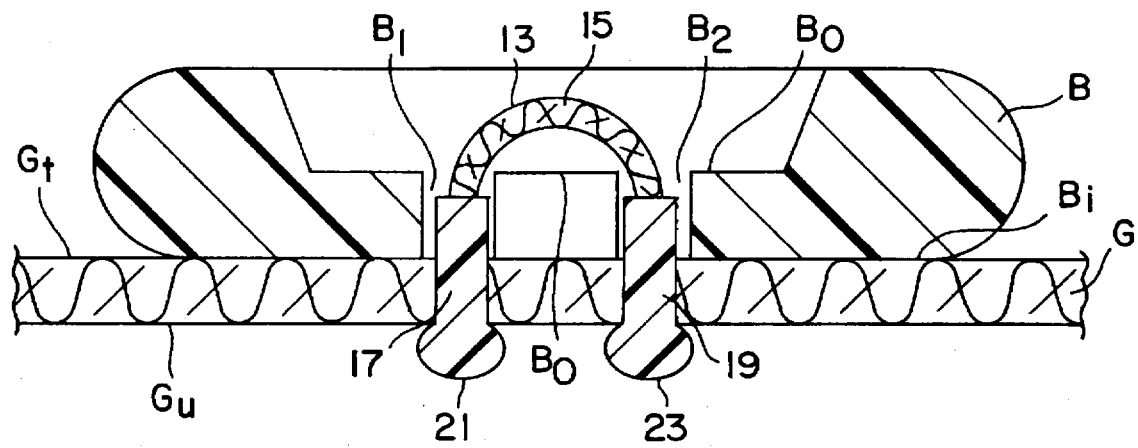
FIG. 2 is a section view showing a button attached to a garment using the fastener shown in FIG. 1.
Figure 3:
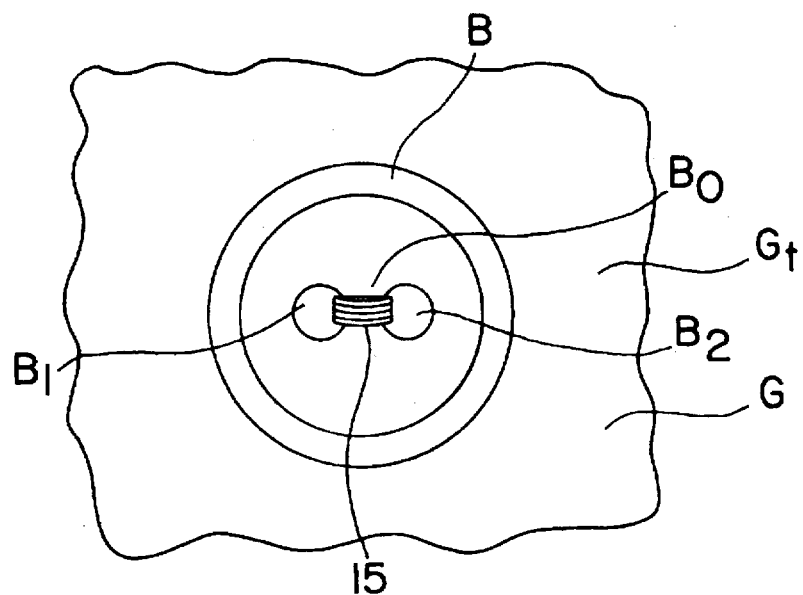
FIG. 3 is a top view of the button, garment and fastener shown in FIG. 2.

Referring now to FIGS. 2 and 3, there are shown section and top views, respectively, of a button B which has been coupled to a garment G using fastener 11. Button B includes an outer surface $B_o$, an inner surface $B_i$, and a pair of button holes $B_1$ and $B_2$. Garment G includes a topside $G_t$ and an underside $G_u$. As can be seen, filament 13 and first and second feet 21 and 23 are appropriately dimensioned so that feet 21 and 23 can be inserted through button holes $B_1$ and $B_2$ and through garment G in such a way as to be retained by underside $G_u$ of garment G. With first and second feet 21 and 23 so positioned, filament 13 extends up through garment G and out through button holes $B_1$ and $B_2$.

As can also be seen, when button B is secured to garment G by fastener 11, the only portion of fastener 11 visible from the top is center portion 15 of filament 13 which is made of thread.

As can be appreciated, end portions 17 and 19 of filament 13 and feet 21 and 23, which are all constructed of plastic, are maximized in length while center portion 15, which is made of thread, is minimized in length to extend only over outer surface $B_o$ of button B. This construction has two advantages. First, the plastic portions improve the overall durability and strength of fastener 11 in holding button B securely to garment G. Second, by constructing center portion 15, which is the only portion of fastener 11 visible from the top, out of thread the illusion is given that button B has been attached to garment G by thread.

Figure 4:
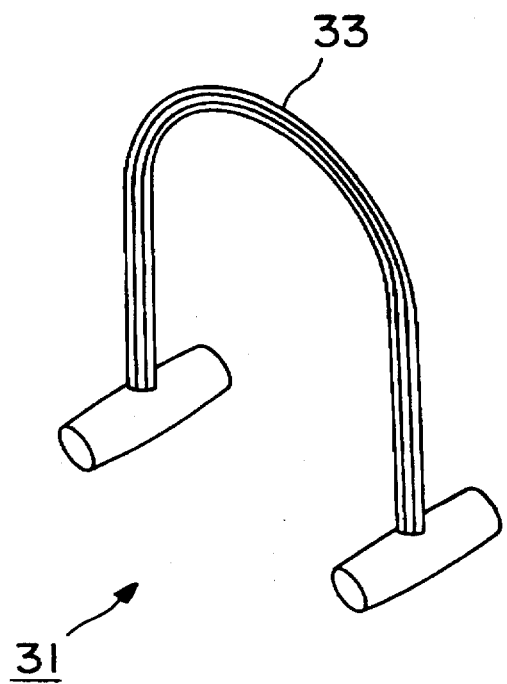
FIG. 4 is a front, right perspective view of another embodiment of the fastener of FIG. 1.

Referring now to FIG. 4, there is shown a perspective view of another embodiment of a fastener for attaching a button or the like to a garment or similar material, the fastener being constructed according to the teachings of the present invention and being represented generally by reference numeral 31. Fastener 31 differs from fastener 11 in that filament 33 is constructed entirely of thread rather only partially of thread.

Figure 5:
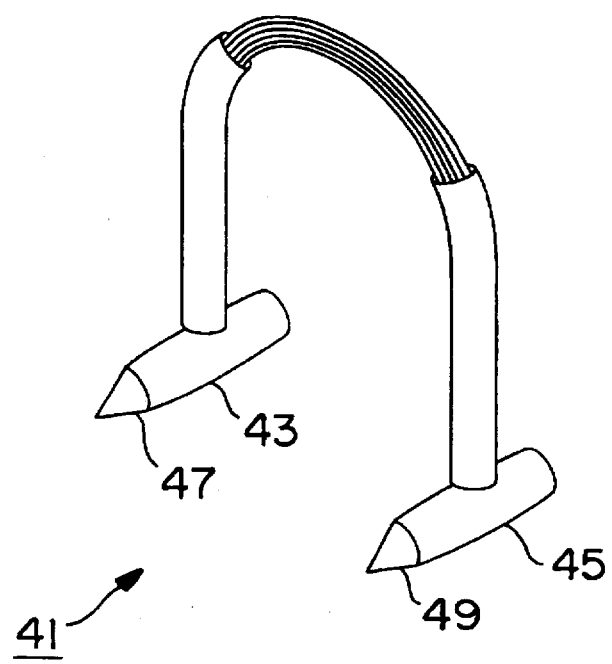
FIG. 5 is a front, right perspective view of another embodiment of the fastener of FIG. 1.

Referring now to FIG. 5, there is shown a perspective view of another embodiment of a fastener for attaching a button or the like to a garment or similar material, the fastener being constructed according to the teachings of the present invention and being represented generally by reference numeral 41. Fastener 41 differs from fastener 11 in that feet 43 and 45 each have a conically shaped tip 47 and 49, respectively, at one end thereof so that they can be pushed through a garment without the use of a needle or tool.

Figure 6:
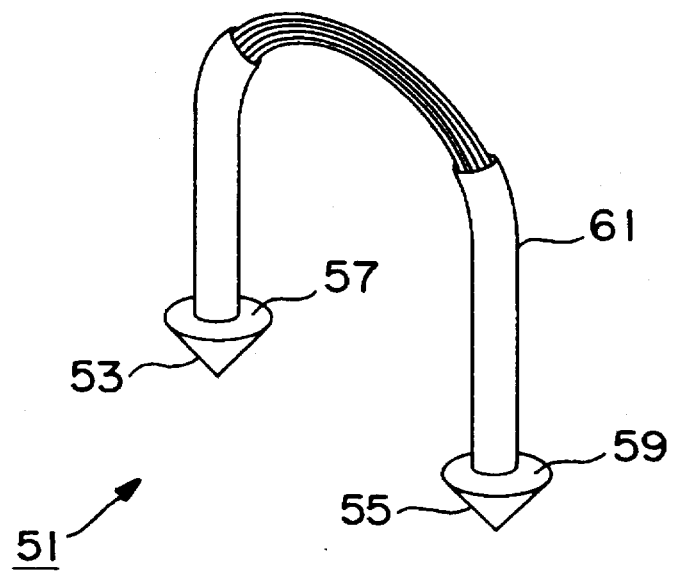
FIG. 6 is a front, right perspective view of another embodiment of the fastener of FIG. 1.

Referring now to FIG. 6, there is shown a perspective view of another embodiment of a fastener for attaching a button or the like to a garment or similar material, the fastener being constructed according to the teachings of the present invention and being represented generally by reference numeral 51. Fastener 51 differs from fastener 11 in that feet 53 and 55 are conically shaped barbs, each having a flat top surface 57 and 59, respectively. Feet 53 and 55 and filament 61 are appropriately dimensioned so as to be insertable through button holes $B_1$ and $B_2$ and through garment G without a needle or tool and in such a way that flat top surfaces 57 and 59 are retained by underside $G_u$.

Figure 7:
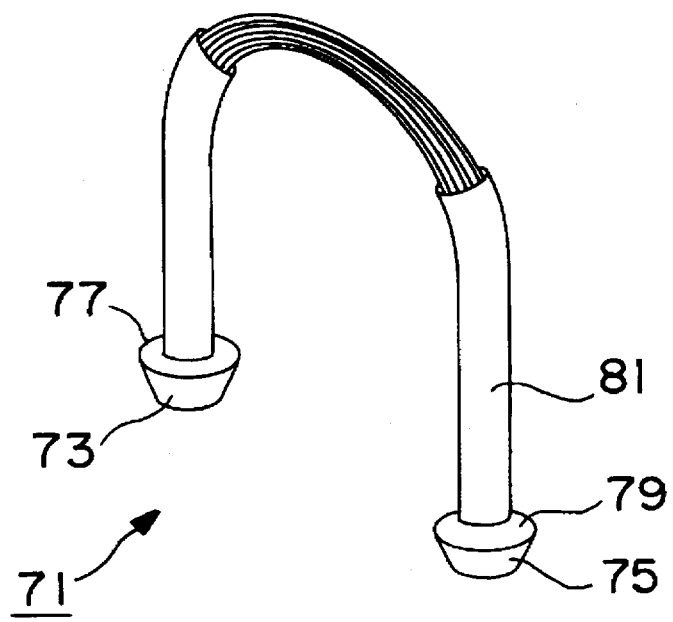
FIG. 7 is a front, right perspective view of another embodiment of the fastener of FIG. 1.

Referring now to FIG. 7, there is shown a perspective view of another embodiment of a fastener for attaching a button or the like to a garment or similar material, the fastener being constructed according to the teachings of the present invention and being represented generally by reference numeral 71. Fastener 71 differs from fastener 11 in that feet 73 and 75 are hemispherically shaped. Feet 73 and 75 and filament 81 are appropriately dimensioned so as to be insertable through button holes $B_1$ and $B_2$ and through garment G in such a way that flat top surfaces 77 and 79 are retained by underside $G_u$.

Figure 8:
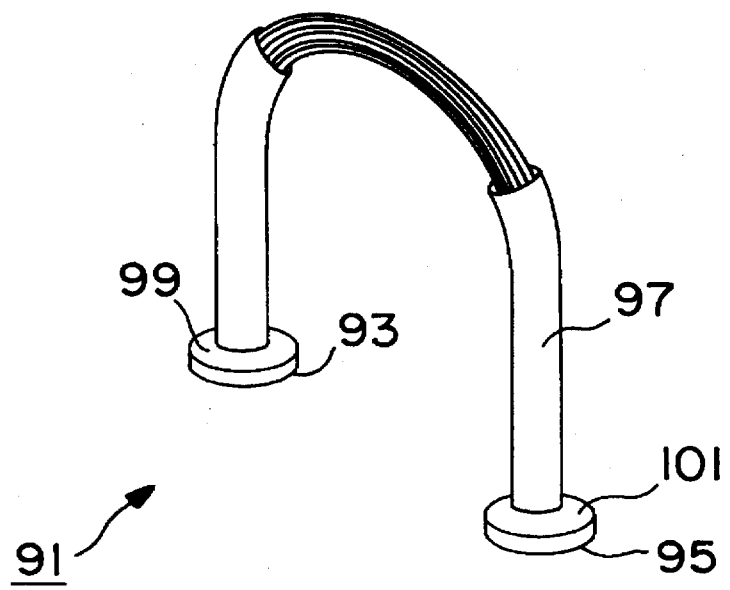
FIG. 8 is a front, right perspective view of another embodiment of the fastener of FIG. 1.

Referring now to FIG. 8, there is shown a perspective view of another embodiment of a fastener for attaching a button or the like to a garment or similar material, the fastener being constructed according to the teachings of the present invention and being represented generally by reference numeral 91. Fastener 91 differs from fastener 11 in that feet 93 and 95 are disc-shaped. Feet 93 and 95 and filament 97 are appropriately dimensioned so as to be insertable through button holes $B_1$ and $B_2$ and through garment G in such a way that top surfaces 99 and 101 of feet 93 and 95 are retained by underside $G_u$.

It should also be noted that a fastener clip could be constructed comprising a plurality of fasteners according to this invention. The fastener clip could then be used by feeding the clip into a fastener attaching tool such as disclosed in U.S. Pat. No. 5,383,260.

Fasteners according to this invention may be made as fastener stock by insert molding of thread in a continuous manner. The method may involve positioning a portion of a length of thread across an open suitably shaped injection mold, closing the mold, introducing plastic material into the closed mold, after the desired cooling period opening the mold, removing the fastener, advancing the thread so that another length is positioned in the mold and then repeating the method.

The embodiments of the present invention described above are intended to be merely exemplary and those skilled in the art shall be able to make numerous variations and modifications to it without departing from the spirit of the present invention. All such variations and modifications are intended to be within the scope of the present invention as defined in the appended claims.

What is claimed is:

1. A fastener for attaching a button or the like to a garment or piece of fabric, the button having an outer surface and two or more holes, said fastener comprising:
   a. a filament, at least of portion of said filament being made of thread;
   b. a first foot at one end of said filament, said first foot being made of plastic; and
   c. a second foot at the opposite end of said filament, said second foot being made of plastic;
   wherein said filament and said first and second feet are appropriately dimensioned so that said first and second feet are insertable through a corresponding pair of holes in the button and through the garment in such a way as to be retained by the underside of the garment, with said filament extending through the corresponding pair of holes and over the outer surface of the button.

2. The fastener as claimed in claim 1 wherein said plastic is urethane.

3. The fastener as claimed in claim 1 wherein said filament comprises a center portion and a pair of end portions.

4. The fastener as claimed in claim 3 wherein the center portion of said filament is made of thread and wherein said pair of end portions of said filament are made of plastic.

5. The fastener as claimed in claim 1 wherein the portion of said filament which is made of a thread is sized so that only thread is visible over the outer surface of the button when the button is attached to the garment or piece of fabric with the fastener.

6. The fastener as claimed in claim 1 wherein said first and second feet are in the shape of bars.

7. The fastener as claimed in claim 6 wherein said bars are transverse relative to said filament.

8. The fastener as claimed in claim 7 wherein said bars each have a conically shaped tip on one end thereof.

9. The fastener as claimed in claim 1 wherein said first and second feet are in the shape of barbs.

10. The fastener as claimed in claim 1 wherein said first and second feet are hemispherically shaped.

11. The fastener as claimed in claim 1 wherein said first and second feet are disc-shaped.

12. A fastener for attaching a button or the like to a garment or piece of fabric, the button having two or more holes, said fastener comprising:
   a. a filament, at least a portion of said filament being constructed of a first material;
   b. a first foot at one end of said filament, said first foot being constructed of a second material; and
   c. a second foot at the opposite end of said filament, said second foot being constructed of the second material;
   d. wherein said filament and said first and second feet are appropriately dimensioned so that said first and second feet are insertable through a corresponding pair of holes in the button and then through the garment in such a way as to be retained by the underside of the garment, with said filament extending between the pair of holes and over the surface of the button.

13. The fastener for attaching a button or the like to a garment or piece of fabric as claimed in claim 12, wherein the second material is plastic.

14. The fastener for attaching a button or the like to a garment or piece of fabric as claimed in claim 12, wherein said filament is U-shaped.

15. The fastener for attaching a button or the like to a garment or piece of fabric as claimed in claim 12, wherein said entire filament is made of said first material.

16. The fastener for attaching a button or the like to a garment or piece of fabric as claimed in claim 12, wherein only the part of the filament extending over the outer surface of the button is made of said first material, the remainder of said filament being made of said second material, said first material being thread, said second material being plastic.

* * * * *